Jan. 17, 1967 — T. J. McMULLIN — 3,299,429
VERTICAL ARRAY OF FOLDED DIPOLES ADJUSTABLY MOUNTED ON SUPPORT MAST
Filed Aug. 5, 1963 — 5 Sheets-Sheet 1

INVENTOR.
Thomas J. McMullin
BY Henry Shur
ATTORNEY

INVENTOR.
Thomas J. McMullin
BY
*Henry Shur*
ATTORNEY

INVENTOR.
THOMAS J. McMULLIN

United States Patent Office 3,299,429
Patented Jan. 17, 1967

3,299,429
VERTICAL ARRAY OF FOLDED DIPOLES ADJUSTABLY MOUNTED ON SUPPORT MAST
Thomas J. McMullin, Dallas, Tex., assignor to Decibel Products, Inc., Dallas, Tex., a corporation of Texas
Filed Aug. 5, 1963, Ser. No. 303,204
1 Claim. (Cl. 343—796)

This application is a continuation-in-part of copending application Serial No. 140,342, filed September 25, 1961, now abandoned.

The present invention relates to an improved lightweight, high strength, broad band antenna adapted to exhibit minimum VSWR (voltage standing wave ratio) and maximum gain over a wide band of frequencies. More particularly, this invention is concerned with an antenna of the type described which comprises a plurality of elements adapted for either transmission or reception, and arranged on a mast or supporting structure so as to readily permit said antenna to exhibit either an omnidirectional pattern or an off-center directional pattern, as the user may desire.

Various antennas have been suggested in the past capable of transmitting or receiving vertically or horizontally polarized waves; capable of exhibiting directional or omnidirectional patterns; capable of reception on various frequencies and bands of frequencies, etc. In general, antennas of the type mentioned are pre-designed for a particular ultimate use, i.e., either as a transmitting or receiving antenna; and such antennas are moreover normally pre-designed for either horizontal or vertical polarization. Further, antennas of the general type suggested heretofore are normally pre-designed to exhibit either a directional or omnidirectional pattern. Thus, in installations wherein both types of patterns may be desirable under differing conditions of operation, it is normally the custom to employ separate antenna systems, one of which is adapted to transmit or receive an omnidirectional, or generally circular pattern, while the other of said antenna systems is adapted to transmit or receive a more directional or off-center pattern.

While efforts have been made to provide antenna systems which are adapted for conversion from one to another of such patterns, such antenna systems suggested heretofore have been relatively complex and costly to install and maintain, and have required elaborate and time-consuming techniques by skilled personnel to effect conversion from one pattern to another.

The present invention, recognizing these difficulties of antenna systems suggested heretofore, is concerned with a highly improved antenna adapted to obviate these various disadvantages. As will become more readily apparent, the antenna of the present invention is so arranged that one is readily able to control the pattern of transmission therefrom (or reception) between a circular pattern shape and a directional pattern shape; and the arrangement is such that changes between the patterns can be quickly effected by non-skilled personnel in a minimum of time and with extremely simple tools. Moreover, as will become apparent, the arrangement of the present invention is such that changes in the pattern shape do not at the same time deleteriously effect changes in the electrical performance of the antenna. More especially, the antenna voltage standing wave ratio (VSWR), terminal impedance, power handling capability, etc., of the antenna retain desired characteristics even with changes in the antenna pattern, thereby obviating further difficulties of prior art systems wherein changes in the antenna pattern concurrently require changes of related equipment to adjust for the changed antenna characteristics normally occurring heretofore.

It is accordingly an object of the present invention to provide an improved antenna adapted for adjustment to provide either a circular or off-center radiation pattern depending upon the particular requirement of the user; and further adapted to permit changes in said pattern with changes in the requirements of a particular user. (In this respect, the phrase "radiation pattern" used herein, and in the appended claim, relates to both the transmission coverage of the antenna when it is used as a transmitting antenna, and to the reception coverage of the antenna when it is used as a receiving antenna.)

Another object of the present invention resides in the provision of a light-weight high strength broad band antenna comprising a plurality of antenna units, preferably folded dipoles, adjustably mounted thereon, with said several folded dipoles being readily adapted for individual replacement as may be required for purposes of maintenance.

Still another object of the present invention resides in the provision of an improved folded dipole adapted to be used as a transmission or reception antenna unit, and adapted for ready adjustment in orientation with respect to a supporting structure and/or with respect to other like such units.

A still further object of the present invention resides in the provision of an improved transmission or receiving antenna which can be readily disassembled for purposes of shipment, and easily installed and reliably operated, even under severe weather conditions. In this respect, and as will appear hereinafter, the antenna of the present invention is so arranged that it is adapted to withstand high wind velocities and heavy ice loads; and the broad band characteristics of the antenna permit it to operate under icing conditions which would render narrow band antennas, of types suggested heretofore, ineffective due to detuning.

A still further object of the present invention resides in the provision of an improved antenna of relatively simple but highly rugged construction adapted to be readily installed and adjusted for either circular or off-center transmission and reception patterns; and adapted to have its radiation pattern readily altered as may be desired in a minimum of time by unskilled personnel, with simple readily available tools.

Another object is to provide an improved antenna which has the foregoing characteristics and advantages but is of relatively low cost.

The foregoing objects, advantages, construction and operation of the present invention will become more readily apparent from the following description and accompanying drawings, in which.

Referring now to FIGURES 1–7, like numerals of which refer to like parts throughout, it will be noted that in accordance with the first embodiment of the present invention, the antenna arrangements may comprise a mast generally indicated at 10, having a plurality of folded dipoles 11 through 14 adjustable mounted thereon. Mast 10 preferably comprises a radiation reflective material of appreciable strength, such as duraluminum. For ease of shipment, mast 10 preferably comprises a pair of sections 10a and 10b adapted to be telescoped one within the other as at 15 (and suitably secured by clamping, bolts or the like), thereby to provide a relatively long mast 10 which can be mounted at the top of a tower by means such as supporting elements 16. In a preferred embodiment of the present invention, the mast 10 has a total length of substantially 21 feet, and comprises a length of 19 feet from the top end thereof down to the top one of supporting members 16. The bottom end of the mast is preferably of 2-inch diameter with a 0.18 inch wall; and the top end of the mast preferably has a 1¾ inch diameter, with a 0.12 inch wall.

Figure 3:
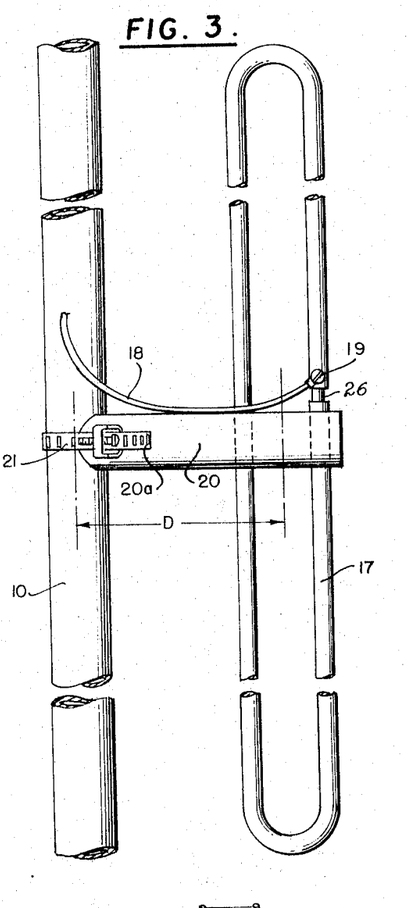
FIGURE 3 is a detail view showing an improved dipole antenna comprising one of the radiating elements illustrated in the antenna system of FIGURES 1 and 2.
Figure 3A:
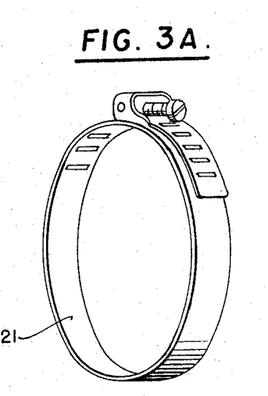
FIGURE 3A is a detail view of one form of attachment which may be employed to mount a dipole of the type shown in FIGURE 3.

As is more particularly illustrated in FIGURE 3, each of the radiating elements 11 through 14 comprises a folded dipole such as dipole 17 fed by an appropriate matching feed cable 18 at a terminal point 19 adjacent insulator 26, and mechanically supported on the mast 10 through the provision of a mounting tube 20, the inner end of which is slotted at 20a to receive a quick releasable banding clamp 21 (see FIGURE 3A). Various forms of quickly changeable fastening means may be employed; and the banding clamp 21 shown in FIGURE 3A represents just one such form, comprising in the particular embodiment shown in the drawings, a banding clamp of the so-called hose clamp type, marketed by Ideal Corporation, Brooklyn, New York, under the designation "Snaplock 56."

Figure 1:
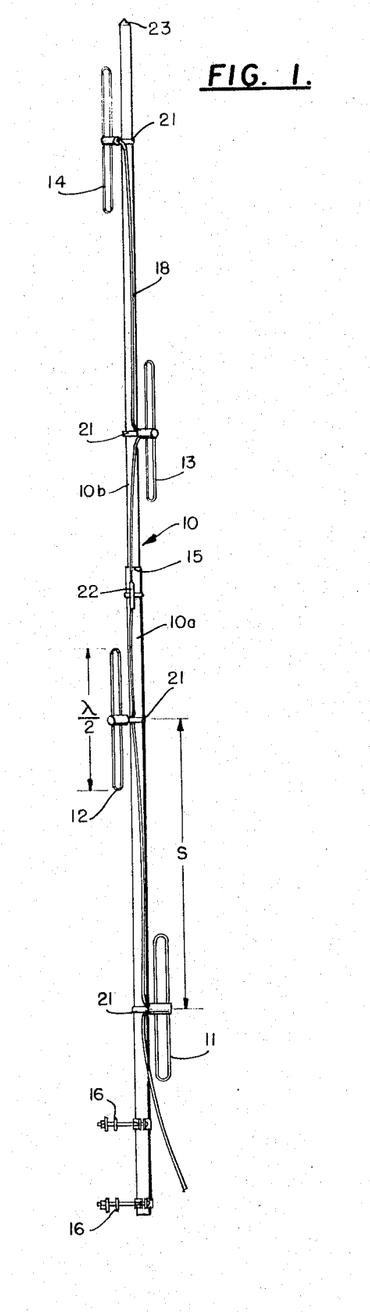
FIGURE 1 is a side elevation illustrating an antenna constructed in accordance with the present invention and adjusted for a substantially circular or omnidirectional radiation pattern.

In the particular embodiment shown in FIGURE 1, four folded dipoles 11 through 14 have been illustrated; and each of these dipoles is attached to the mast 10 by a releasable clamping means 21. The several dipoles are one-half wavelength long, and are equally spaced from one another by a distance S along the direction of extension of the mast 10, thereby to provide a vertically stacked array of said dipoles. Moreover, as is more particularly illustrated in FIGURE 1A, the several stacked dipoles are positioned substantially 90 degrees about the axis of mast 10. Matching feed cables 18 interconnect the several dipoles 11 through 14 whereby said dipoles are fed in time phase with one another. Cables 18 selected for this interconnection are preferably of a highly flexible nature, thereby to permit the several dipoles 11 through 14 to be oriented through a considerable arc around the mast 10. In addition, the cables 18 are preferably connected to a terminal structure 22 held in place near the center of the mast 10 and substantially midway in the vertical stacked array, thereby to permit a center feed of the several dipoles 11 through 14, inclusive, to minimize tilting of the vertical lobe pattern and thus to give optimum low angle radiation.

Figures 1A, 2, 2A:
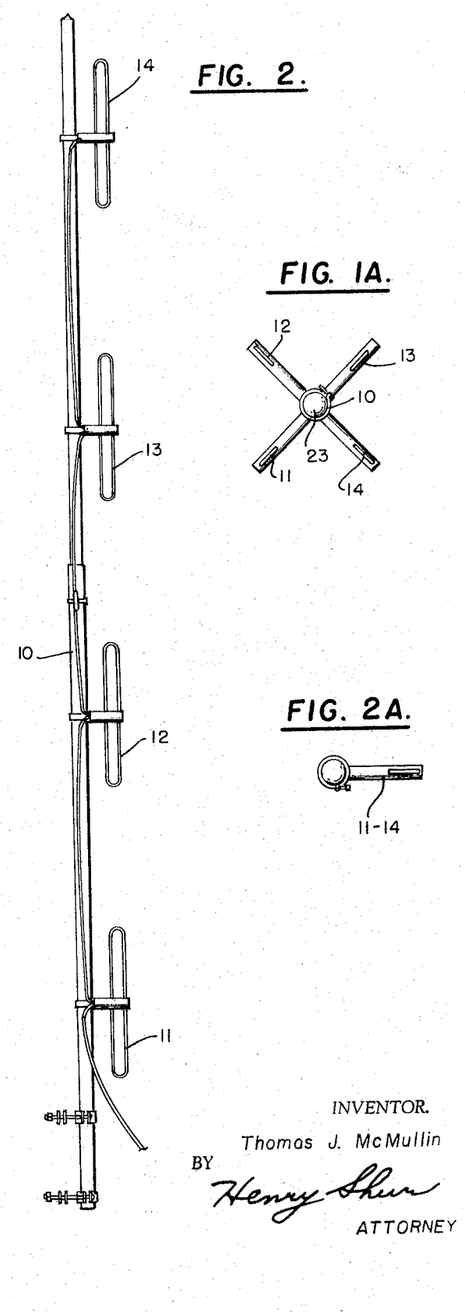
FIGURE 1A is a top view of FIGURE 1.
FIGURE 2 illustrates the antenna of FIGURE 1 adjusted to provide an off-center or directional radiation pattern.
FIGURE 2A is a top view of the antenna shown in FIGURE 2.
Figure 6:
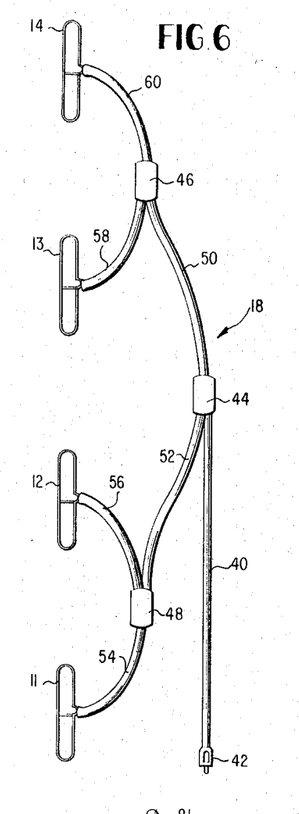
FIGURE 6 shows a preferred form of feed harness for the antenna of FIGURE 1.

While any suitable feed cable arrangement may be employed for in-phase feeding of the antenna elements of FIGURES 1 and 2, FIGURE 6 shows a preferred center feed harness arrangement wherein the feed cable 18 takes the form of a feed line 40 having a suitable radio frequency connector 42 at its lower end supplying the dipoles 11, 12, 13 and 14 through three T-junctions 44, 46 and 48. The T-junctions may be molded spliced connections and feed to the upper two dipoles 13 and 14 is by way of a three-quarter wavelength section of line 50, and to the lower two dipoles by a similar three-quarter wavelength section of line 52. The individual dipoles are fed by any suitable odd quarter wavelength line such as lines 54, 56, 58 and 60. In order to obtain in-phase feeding line 50 should be electrically equal in length to line 52 and the individual lines 54, 56, 58 and 60 should all be electrically equal.

Figure 7:
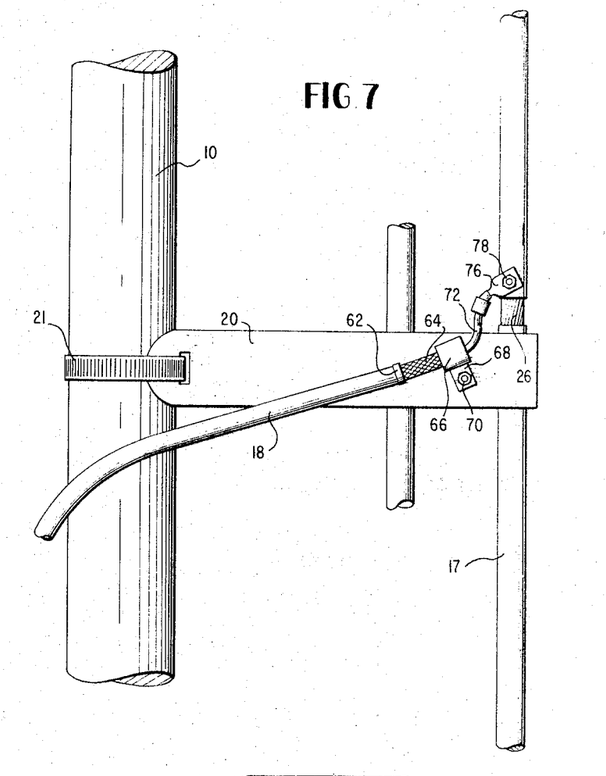
FIGURE 7 shows details of the connection of the feed to an individual dipole.

FIGURE 7 shows the details of a preferred electrical connection of the feed cable 18 to each of the dipoles. As illustrated, mounting tube 20 is attached to mast 10 by the banding clamp 21 and the tube, in turn, supports the two vertical dipole sections of the folded dipole 17. The outer insulating layer of the coaxial cable 18 is stripped back at its end, as indicated at 62 to expose the outer cable conductor braid 64. A metal ferrule 66 surrounds and engages the outer conductor 64 and carries a lug 68 which is grounded to the tube 20 and mast 10 by a screw 70.

The inner conductor of the coaxial cable also surrounded by insulation 72 is electrically connected to a lug 76 attached to one side of the dipole by a screw 78 for effecting electrical connection to the ungrounded side of the dipole.

Before discussing the particular operation of the structure shown in FIGURE 1, certain further features of that structure should be noted. The mast 10 preferably includes a cap 23 of a somewhat pointed nature; and the mast itself is so arranged and mounted as to exhibit a low resistance to ground whereby the mast is capable of handling high current lightning discharges without coming apart. The pointed top cap and grounded design of the radiating elements thus afford extra lightning protection. It should further be noted that the folded dipoles themselves have an open construction thereby to avoid moisture collection and condensation which is a serious problem in enclosed antennas of the types suggested heretofore. The mast and dipole elements, being of simple duraluminum construction, have high inherent strength and a built-in durability against the weather conditions, thereby avoiding the need of fiber housing for strength and protection, as is customarily used in a number of antennas suggested heretofore. The relatively thin over-all construction of the antenna moreover permits it to withstand high wind velocities; and the mechanical arrangement is such that the system is capable of bearing heavy ice loads without mechanical distortion.

The individual dipoles exhibit a broad band response, being capable of use over a wide band of frequencies, e.g., in the range of 132 to 174 megacycles, or at other frequency ranges up to 1000 megacycles such as may be selected by appropriate design of the dipoles. The broad band characteristics of the folded dipoles employed, moreover, permit the said dipoles to operate under icing conditions which would render narrow band antennas ineffective due to detuning thereof.

For duplex or mobile relay operation, a single antenna and transmission line of the type described can be used for both transmitting and receiving operations through the use of a suitable duplex or decoupling cavity at the equipment end. This single antenna can moreover be mounted on top of a tower to give the same pattern for both receive and transmit operations thereby avoiding the holes in coverage caused by side mounting of one antenna which is generally necessary when two antennas are employed for transmitting and receiving operations. Indeed, in most cases the savings over two antennas and two lines effected by the single antenna construction shown in FIGURE 1 will more than compensate for the cost of the duplexer or like equipment employed for transmitting and receiving operations.

In short, the antenna thus far described in reference to FIGURE 1 exhibits highly desirable mechanical features, and is also capable of wide variations in use over a wide frequency band; and even in single frequency operations the antenna of the present invention offers the substantial advantage of being less subject to detuning from ice whereby it is far more reliable in all weather performance than other antennas suggested heretofore.

In the particular arrangement shown in FIGURE 1, a total of four folded dipoles displaced 90 degrees from one another have been illustrated; but as mentioned, a generally similar result can be accomplished by employing, for example, six dipoles spaced 120 degrees from one another to provide two complete spirals in the vertical array about mast 10. In either event, the particular arrangement shown in FIGURE 1 provides a substantially omnidirectional pattern of the type shown at 24 in FIGURE 4.

Figure 4:
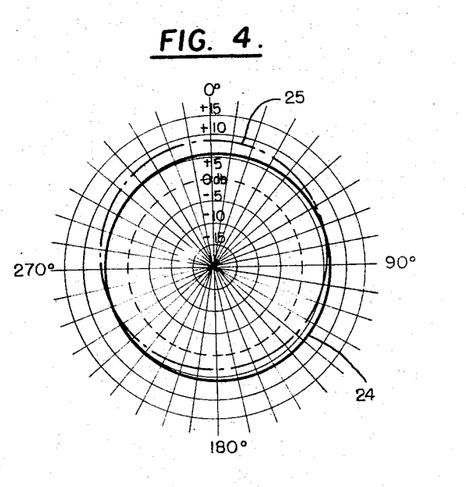
FIGURE 4 is a graphical representation in polar coordinates showing typical radiation patterns and gains which may be accomplished by the structure of FIGURE 1.

In one embodiment the omnidirectional pattern 24 provides a substantially six db gain omnidirectional pattern in all azimuths; and this particular gain characteristic has been shown in the polar diagram of FIGURE 4. To effect this omnidirectional pattern, the several elements 11 through 14 are, as illustrated in FIGURE 1, substantially equally spaced from one another by a distance S, which may be between one-half and one-and-one-half wavelength. However, for practical and optimum gain conditions, distance S is generally selected to be around 0.9 wavelength. If the spacing is much less than 0.75 wavelength, the one-half wavelength long elements 11 through 14 tend to be too close to one another when the said individual elements are adjusted for in-line operation.

When it is desired to convert the antenna system shown in FIGURE 1 from one producing a substantially omnidirectional pattern of the type described to an off-center elliptical or more directional pattern, this can be readily accomplished by the simple expedient of loosening the various clamps 21 (e.g., by means of a screwdriver), and then readjusting the positioning of the several elements 11 through 14 into a linear vertically stacked array of the type shown in FIGURES 2 and 2A. With this change in orientation into an in-line array, the omnidirectional pattern 24 changes to an off-center pattern such as shown at 25 in FIGURE 4. In the particular embodiment illustrated herein, the off-center pattern thus produced gives a 3 db gain (doubling the power) in the direction of the aligned radiators 11 through 14. A pattern is thereby produced which may have a gain of substantially 9 db in the zero degree azimuth. The sides of the pattern at the 90-degree and 270-degree points exhibit substantially the same field strength as was the case with the circular or omnidirectional pattern; and, to the rear of the array, the directional pattern is such that the gain falls from substantially 6 db to substantially 2 db. These figures, it must be understood, are merely exemplary, and in other installations constructed in accordance with the present invention, it has been found for example that the change in pattern from circular to directional can be even more pronounced, going for example from a 7.4 db gain omnidirectional pattern to a 12.2 gain directional pattern. When the several elements 11 through 14 are readjusted into the in-line position shown in FIGURE 2, so that the elements are positioned in line on one side of the mast 10, the mast itself acts as a reflector so that greater radiation occurs in the direction that the elements face, with lesser radiation occurring in other directions resulting in a directional horizontal pattern.

This operation of the over-all system imposes certain critical limitations on the distance D shown in FIGURE 3, i.e., on the spacing between the center line of the folded dipole elements 17 and the center line of mast 10. It is desirable in the omnidirectional pattern installation shown in FIGURE 1 to keep the distance D small so that the center of dipole element 17 lies close to the center of support mast 10; and in no event should the distance D exceed 3/16 wavelength since opposite elements would then have displacement of 3/8 wavelength. It is apparent that as the displacement between such opposite elements exceeds one-quarter and approaches one-half wavelength, cancellation would occur between the elements at some azimuths, with reinforcements at others; and this would seriously distort the desired omnidirectional pattern. These considerations therefore dictate that, for proper operation of the omnidirectional array shown in FIGURE 1, the mounting arm 20 (see FIGURE 3) should be so selected in length as to provide a distance D preferably less than 1/8 wavelength and certainly not in excess of 3/16 wavelength.

In the directional pattern embodiment shown in FIGURE 2, it is desirable that the distance D be something more than a finite distance because the mast must, as mentioned, act as a reflective member to produce the directional pattern desired; and if D is too small, the dipole becomes loaded too greatly and will not radiate efficiently. In a preferred design, the distance D is held to substantially .08 wavelength; and this particular distance has been found to provide good operation of the system on both omnidirectional and directional patterns.

The particular arrays shown in FIGURES 1 and 2 are, as mentioned previously, designed to be mounted by means of support members 16 at the top of a tower or the like. If desired, however, the array can be side mounted on a tower, and this particular embodiment of the invention has been shown in FIGURE 5. In this latter embodiment, the tower 30 may take a conventional triangular form measuring for example 18 inches to 24 inches between the several legs thereof; and an arrangement of the type shown in FIGURES 1 or 2 may be attached to one of said legs by means of braces 31 clamped to the supporting means 16 at the lower end of mast 10 and by means of a further brace 32 attached as shown to the top of mast 10. For a tower having a spacing of substantially 18 to 24 inches between the legs, the braces 31 and 32 may be chosen to space mast 10 outwardly from its associated tower leg by approximately 18 inches.

Figure 5:
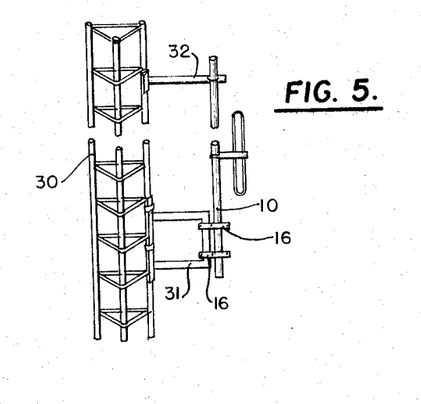
FIGURE 5 illustrates the structure of FIGURE 1 side mounted on a triangular tower.

It will be appreciated that when antennas are side mounted as illustrated in FIGURE 5, their normal horizontal patterns are distorted. However, this distortion can be used to advantage if the pattern shape is known. In one particular example, it has been found that when the mast 10 has the several dipoles 11 through 14 spaced thereabout as in FIGURE 1, such an array, mounted as illustrated in FIGURE 5, produces a pattern having a gain of substantially +8 db in the zero degree azimuth direction, a gain of substantially +8.4 db in the 90-degree and 270-degree azimuth directions, and a gain of substantially −4 db in the 180-degree azimuth direction.

The pattern changes when the mast 10 has the several dipole elements 11 through 14 in aligned array as in FIGURE 2; and the actual pattern produced has been found to depend upon whether the elements face away from the tower (as illustrated in FIGURE 5) or toward the tower. With an in-line vertically stacked array of the type shown in FIGURE 2, and with the several dipole elements facing away from the tower, as illustrated in FIGURE 5, it has been found that a pattern can be produced having a gain of +9.4 db in the zero direction, +8.5 db in the 90-degree and 270-degree directions, and a gain of −8 db in the 180-degree direction. When the several elements 11 through 14 are turned to face toward the tower 30 in in-line relation to one another, the pattern produced has been found to produce a gain of +6.8 db in the zero-degree direction, +8.2 db in the 90-degree and 270-degree directions; and +1 db in the 180-degree direction.

All of these figures are, of course, approximate, and will vary depending upon the particular frequencies employed. It should also be noted that rather than being side mounted on one of the legs of a triangular tower, the antenna can, if desired, be mounted on a tower face between two adjacent legs; and in such a case, the gain figures will still approximate those given above.

The same basic design can be provided for various frequency bands up to 1000 mc.; and, in all such cases, the same basic design is employed and the general operation is effected with the exception that the gain considerations change slightly with changes in designed frequency. In any event, omnidirectional or directional patterns may be achieved as desired, and the antenna may be adjusted for change from one to another such pattern simply and quickly. With such pattern changes, the antenna still holds essentially its rated gain and VSWR on any particular frequency in its designed span of frequency, without any need for re-adjustment of the antenna or equipment end of the system.

While this specification and appended claims refer in various instances to wave length considerations, and to the relationship between the sizes of various parts and operating wave length of the antenna, it is noted that such relationships for broad band antennas of the type here involved are approximate rather than precise. For example, a typical antenna according to this invention is designed to operate at 148 to 159 mcs., with transmission and reception by means of the same antenna at frequencies 5 to 10 mcs. apart. As will be appreciated, for such frequencies and typical band widths (e.g., 10–15 mcs.), the change in wave length for frequencies varying between the upper and lower ends of the antenna band width is a relatively small percentage of the actual wave length at a given frequency within the band width. Hence, a given set of antenna parameters, such as dipole wavelength, distance S (in FIGURE 1), and distance D (in FIGURE 3), may be used for a typical operating frequency and band width. Accordingly, the term half wave dipole, and relation of the various spacings of antenna components to wavelength are apt ways of expressing the size and positioning of various parts in the claim.

As will be apparent from the foregoing, the present invention contemplates the provision of an antenna comprising in essence a vertically polarized colinear stacked array of half-wave folded dipole elements of varying number (e.g., 4, 6 or 12), which are evenly spaced along a central support mast, being attached to said mast by quick release positive locking clamps whereby the individual dipole elements can be readily positioned at various orientations with respect to the central elongated axis of the mast. As noted, the several elements comprising the antenna are interconnected by appropriate matching feeder cables, whereby they are fed in time phase; and the feeder cables employed are preferably highly flexible in nature so that the dipole elements can be oriented through a considerable arc around the mast. (Terms such as "feeder cables" and "feeding" of the elements used herein are, it will be appreciated, intended to cover both coupling of energy from the equipment end to the antenna when said antenna is used for transmitting, and coupling of received energy from the antenna to the equipment end of the system when said antenna is used for reception.)

The folded dipole elements can be symmetrically oriented around the mast (four dipole elements may be spaced from one another by 90-degree displacements, or six or twelve dipole elements may be displaced from one another by other angular relations, e.g., 120-degree spacings) thereby to effect a plurality of complete spirals around the mast. In either case, the symmetrically oriented vertically stacked array of dipole elements operates in such an arrangement to produce a horizontal radiation pattern which is substantially omni-directional, providing equal radiation on all azimuths of a circle.

As will also be apparent, the symmetrical orientation of dipole elements around the mast can be readily altered to an in-line vertically stacked orientation by the simple expedient of loosening individual clamps on the several dipoles and realigning the dipole elements on one side of the mast. When the elements are thus positioned, the mast acts as a reflector so that greater radiation occurs in the direction which the elements face, with lesser radiation occurring in other directions, thereby producing a directional horizontal radiation pattern.

By the technique and arrangement described, a user of the antenna equipment is able to conveniently change the radiation pattern from an omnidirectional to a known or predictable directional pattern. A given antenna installation can thus be used by a station whether or not it is in the geographical center of its coverage area; and, as coverage requirements are altered, a simple readjustment of the antenna can be readily effected to take care of the changed requirements. By reason of the controllable pattern, moreover, a much wider variation is permitted in the actual location of the antenna for a given station to readily accommodate its pattern to existing topographical conditions, etc. Higher noise conditions, e.g., on reception over one sector, may dictate use of more power gain over the sector so as to overcome the noise, and the adjustable features of the present antenna readily permit such adjustments in power gain to be effected. Indeed, if coverage conditions change after initial installation, requiring greater power gain in some directions, the antenna of the present invention permits alternations in the coverage to be quickly accomplished without any change in the basic antenna or equipment end of the system. The individual antenna elements are moreover, by reason of their form of mounting, not only adapted for ready adjustment but also for convenient replacement in the event that a radiating element is damaged by lightning, ice, or storm conditions.

FIGURES 8 through 14 show a modified embodiment of the novel antenna of the present invention wherein the feed cable 18 is completely enclosed within the interior of the aluminum mast. In this embodiment the mast generally indicated at 80 is again provided with four folded dipole antenna elements 81, 82, 83 and 84 shown spaced circumferentially around the mast in FIGURES 8 and 8A for omnidirectional transmission or reception and shown in FIGURES 9 and 9A rotated to an in-line arrangement for directional transmission or reception. Mast 80 is again preferably made of duraluminum and again comprises two sections including upper section 86 and lower section 88. However, in this embodiment the two mast sections do not telescope but are joined by a pair of flanges 90 and 92 formed integral with a pair of high strength aluminum cast sleeves 94 and 96 press fit over and rivetted to the adjacent ends of the two mast sections. The flanges may be joined by a plurality of bolts passing through holes such as 98 illustrated in FIGURE 11. Mounting clamps 16 may be provided on the lower mast section 88 as in the embodiment of FIGURE 1.

Figure 10:
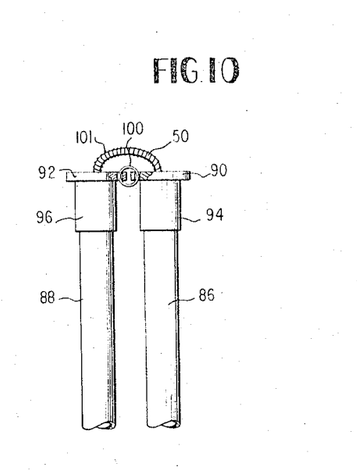
FIGURE 10 shows the manner of attaching the folded mast sections of FIGURE 9 during shipping.
Figures 11, 12, 13:
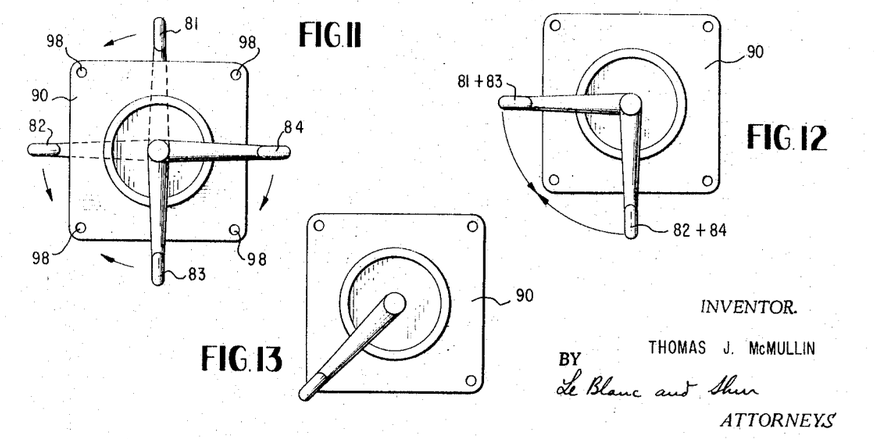
FIGURES 11, 12 and 13 show various steps in the adjustment of the antenna from the omnidirectional configuration of FIGURE 8 to the directional configuration of FIGURE 9.

FIGURE 10 shows the manner of connecting the two mast sections 86 and 88 during shipping. The bolts passing through holes 98 and normally securing the two sections together are removed and the top section 86 is folded downwardly so as to extend parallel to and closely adjacent the lower section 88. The two sections may be fastened together in this parallel position as illustrated in FIGURE 10 by a pair of wire loops passing through the adjacent apertures in the flanges 90 and 92, which wire loops such as that illustrated at 100 form a hinged type connection whereby upon assembly the upper section 86 may be simply rotated back into the position illustrated in FIGURES 8 and 9, the wire loops 100 cut and removed, and the two sections bolted together.

A zinc plated spiral steel spring 101 surrounds the midportion of the feed cable 18 within the mast at the point of hinging of the two mast sections. The purpose of this spring is to straighten the feed cable when the two sections are hinged back together from the position shown in FIGURE 10 and also to provide good mechanical protection against any abrasive damage during handling and assembly. This coiled steel spring is preferably about eighteen inches long with its center at the hinge of the mast. The center T junction 44 of FIGURE 6 is positioned in the lower section of the mast so that the lower end of the coiled spring 101 fits against this junction.

Figure 8:
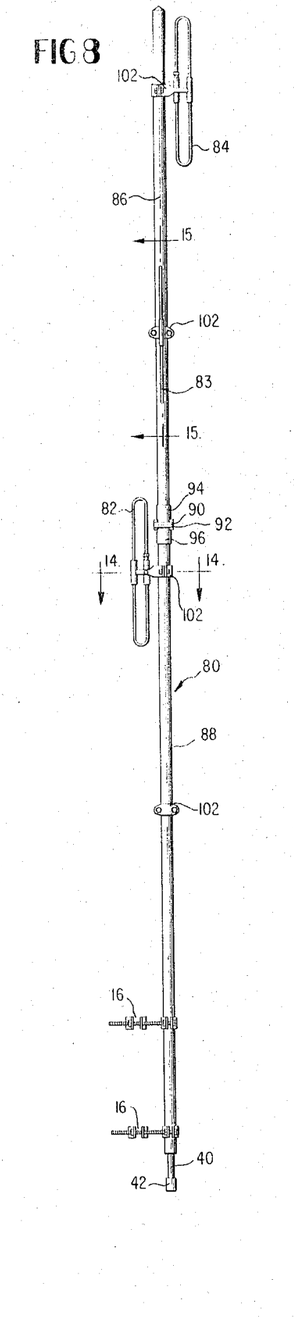
FIGURE 8 is a side elevation of a modified embodiment of the antenna of this invention.
Figure 8A:
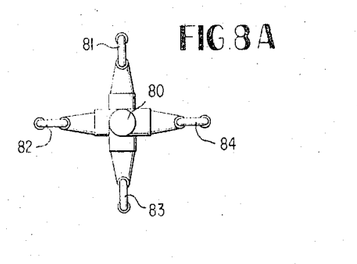
FIGURE 8A is a top view of FIGURE 8.
Figure 9:
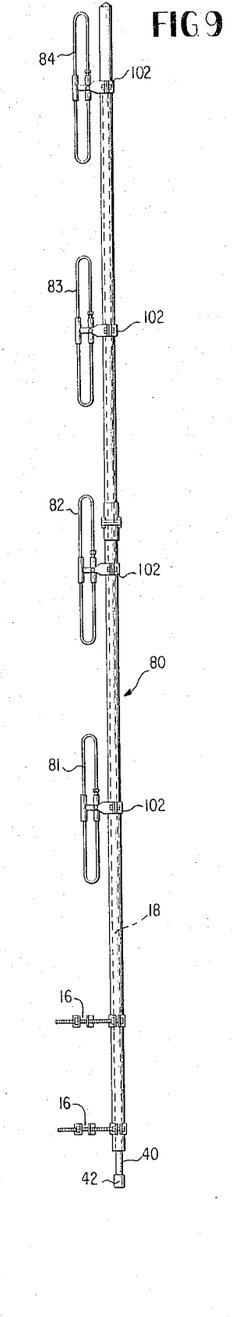
FIGURE 9 illustrates the antenna of FIGURE 8 adjusted to provide an off-center or directional radiation pattern.
Figure 9A:
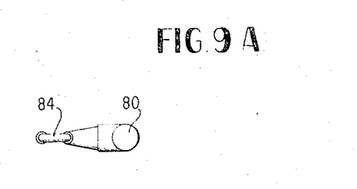
FIGURE 9A is a top view of the antenna shown in FIGURE 9.

FIGURES 11, 12 and 13 show various steps in the sequence of rotating the antenna configuration from omnidirectional as shown in FIGURES 8 and 8A to in-line or directional as shown in FIGURES 8 and 8A to in-line or directional as shown in FIGURES 9 and 9A. The antenna in FIGURE 11 is illustrated as in the omnidirectional position. In the first step, the mounting clamps 16 are loosened and the bolts joining the two flanges 90 and 92 removed. The top section 86 of the mast is then rotated 90° from the position of FIGURE 11 in a clockwise direction. At the same time, the lower mast section 88 is rotated 90° from the position of FIGURE 11 in a counter-clockwise direction as illustrated by the arrows in FIGURE 11 so that the mast assumes the position illustrated in FIGURE 12 wherein the dipoles 81 and 83 are in vertical alignment and spaced 90° from the also vertically aligned dipoles 82 and 84. After this rotation of the two mast sections, the flanges 90 and 92 are recoupled together by the bolts and mounting clamps 16, then retightened with the now modified directional unit in any desired angular position.

The mounting tubes 102 by which the respective elements are secured to the mast 80 are then loosened and the individual dipoles are rotated 45° to bring them all completely in alignment as illustrated in FIGURE 13. Dipoles 81 and 83 are rotated 45° in a counter-clockwise direction and dipoles 82 and 84 are rotated in a counter-clockwise direction from the position of FIGURE 12 as illustrated by the arrows in that figure.

Figure 14:
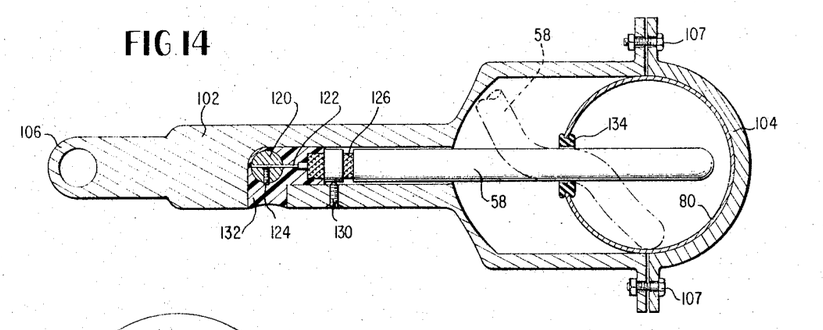
FIGURE 14 is a cross section taken along line 14—14 of FIGURE 8 and shows the mounting of an individual dipole.
Figure 15:
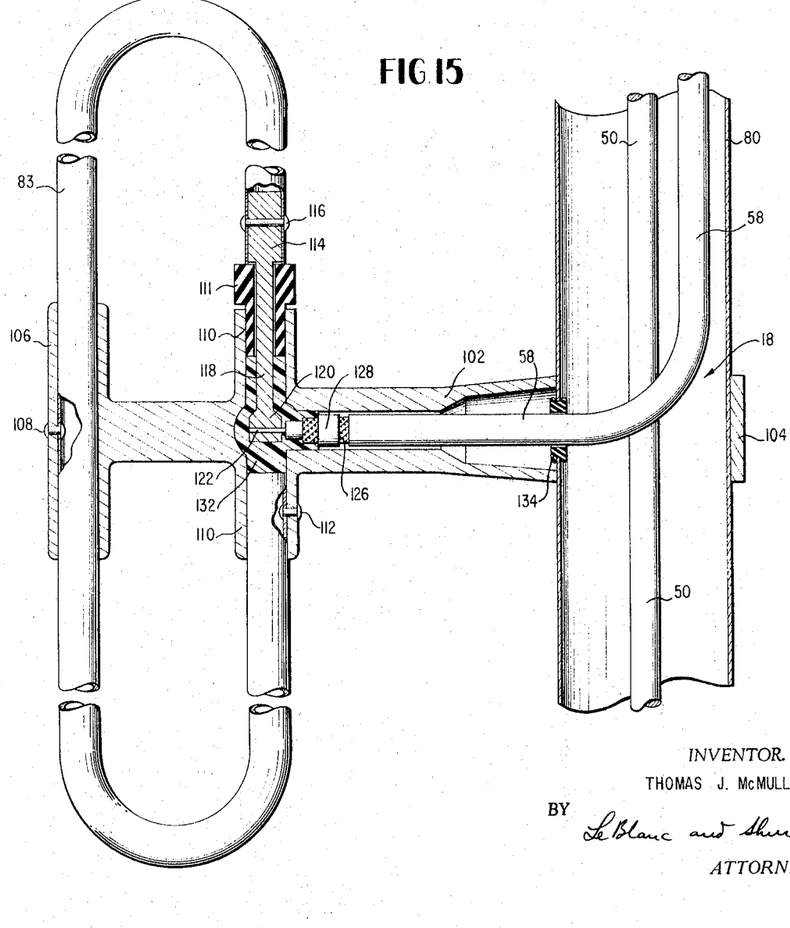
FIGURE 15 is a cross section taken along line 15—15 of FIGURE 8.

FIGURES 14 and 15 show the details of the rotatable mounting tubes 102 and the electrical connection for the individual dipoles. The mounting tubes 102 are secured to the mast 80 by semi-circular band clamps 104 and bolts 107. The outer end of the mounting tube 102 is provided with a vertical sleeve 106 illustrated in FIGURE 15 as connected by a rivet 108 to the hollow outer vertical element of the dipole 83. A similar inner sleeve 110 receives the end of the hollow inner dipole element and is connected thereto by a rivet 112.

Received within the end of one terminal of the inner dipole element is a circular cross sectioned series inductor 114 connected to the dipole by a rivet 116 and having a reduced diameter section 118 including an enlarged diameter end 120. The enlarged end 120 is provided with a suitable transverse aperture receiving the inner conductor 122 of coaxial cable lead 58 and the conductive metallic inductor 114 is electrically connected to the inner coaxial conductor 122 by a set screw 124 as shown in FIGURE 14. The outer insulating layer of the cable is peeled back so that the outer conductor braid 126 of the cable is exposed, and secured to this braid is a passive conductive metal ferrule 128 grounded to the mounting tube 102 and the mast by a set screw 130 also illustrated in FIGURE 14. The area surrounding the end of the coaxial cable and the connection of the cable with the series inductor 114 is preferably filled with a foam dielectric material illustrated at 132. This material acts as insulation along with insulating sleeve 111 and also as a seal to completely seal off the unit against the atmospheric elements.

Enough slack is provided in the feed harness 18 so that the dipoles may be rotated as previously described in conjunction with FIGURES 11, 12 and 13 and the dipole leads pass through a grommet 134 mounted in the wall of the mast 80 so as to avoid damage to the cable leads when the elements are rotated. The feed harness does not need to be secured inside the mast because the molded T junctions are of such size that they position the cable centrally within the tube but still allow the small amount of movement required when the tube is hinged together with both sections lying side by side from the straightened out position or vice versa. There is sufficient support of the cable where each lead goes through the rubber grommet into the tube support arms for the dipoles, and the bottom connector of the antenna is mechanically secured in the base of the mast where it is terminated in a female connector whose end lies just inside the end or bottom of the mast. This prevents any strain on the cable inside after the transmission line is connected to the antenna. In FIGURE 14 of the cable lead 58 is illustrated in solid lines in the unrotated position while the dashed line position of the cable illustrates the distortion permitted by the slack in the harness when the dipole element is rotated through 45° in a clockwise direction in FIGURE 14.

The spacing of the dipoles from the mast in the embodiment of FIGURE 8 and the spacing between individual dipoles is the same as that for the embodiment of FIGURE 1 previously discussed. By way of example only, a center-to-center spacing of the dipole elements in FIGURES 8 and 9 of 0.87 wavelength has been found quite satisfactory. As before, this distance may vary from three quarters of a wavelength to one and one-half wavelengths while at the same time preserving the versatility of the antenna for use both as an omnidirectional and a directional unit.

An important feature of the embodiment of FIGURE 8 resides in the fact that the antenna is completely sealed against the atmospheric elements and the feed harness completely contained within the mast. The completely enclosed feed line provides a more uniform pattern and one which can be duplicated in production more readily due to the absence of any feed lines lying outside the mast support which might tend to cause small variations or irregularities in the antenna pattern.

The construction of FIGURE 8 additionally provides complete protection of the antenna and feed harness against lightning damage. Any lightning discharge to the top point of the mast allows the currents to travel along the highly conductive aluminum member and through the metal clamps 16 to the tower or metal mast support of the antenna mast itself. Since the folded dipoles are almost a perfect short at the very low frequency A.C. currents found in a discharge of lightning, practically no current itself can be induced between the center conductor and the copper braid of the coaxial cable. The thickness of the aluminum wall of the mast is such that it shields the cable harness inside from any strong electrostatic field set up by the lightning discharge on the mast or in the vicinity of the mast.

The interior feed harness also provides complete protection of the assembly from weather and its deteriorating effects as well as from damage during handling and rotation. It substantially extends the life of the cable which may be made with polyethylene insulation and which might otherwise tend to deteriorate from ultra-violet radiation of the sun. Furthermore, the absence of projecting elements from the antenna other than the dipoles and mounting tubes makes it possible for the antenna to withstand substantially increased wind and ice loads without failure.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

An antenna system having an alterable horizontal radiation pattern comprising an elongated substantially vertically disposed mast of radiation reflective material having upper and lower sections, rotatable flange means securing said sections together whereby one of said sections may be rotated relative to the other, a plurality of elongated substantially half wave antenna elements attached to said mast, each of said elements extending in a generally vertical direction generally parallel to said mast and spaced equal angles about said mast, said plurality of elements being substantially evenly spaced from one another along the length of said mast on centers disposed between three-fourths and one and one-half wavelength of the operating frequency of said antenna system, each of said elements being spaced outwardly from said mast by a distance less than three-sixteenths wavelength of said operating frequency, a rotatable mounting tube securing each of said elements to said mast, a center feed coaxial cable harness within said mast having feed lines passing through said mounting tubes to establish electrical connection to one side of said elements, means for grounding the other side of said elements to said mast, and foam dielectric means sealing off said cable and feed lines.

References Cited by the Examiner
UNITED STATES PATENTS

| | | | |
|---|---|---|---|
| 2,419,552 | 4/1947 | Himmel et al. | 343—879 X |
| 2,471,045 | 5/1949 | Selvidge | 343—796 X |
| 2,583,210 | 1/1952 | Edwards | 343—890 X |
| 2,632,850 | 3/1953 | Anderson | 343—880 X |
| 2,757,371 | 7/1956 | Scheldorf | 343—905 |
| 3,008,140 | 11/1961 | Rose | 343—758 |
| 3,158,866 | 11/1964 | Powers | 343—882 |
| 3,175,219 | 3/1965 | Wernick et al. | 343—799 |

OTHER REFERENCES

Andrew Corp. Catalog No. 22; received in Group 250 Nov. 11, 1958; pages 27, 34, 35, 37, 66, 67 and 78 relied on.

HERMAN KARL SAALBACH, *Primary Examiner.*

E. LIEBERMAN, *Assistant Examiner.*